H. G. FISKE.
Lawn-Mower.
No. 220,226.   Patented Oct. 7, 1879.
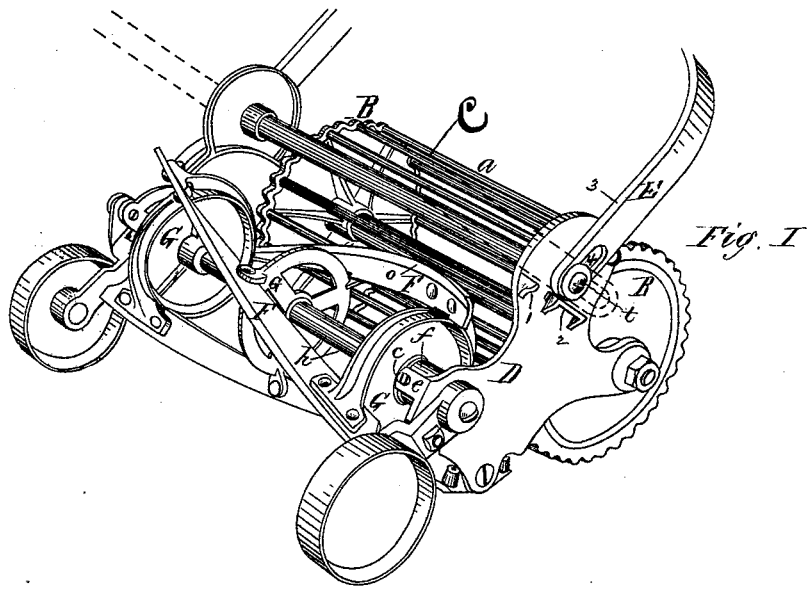
Fig. I
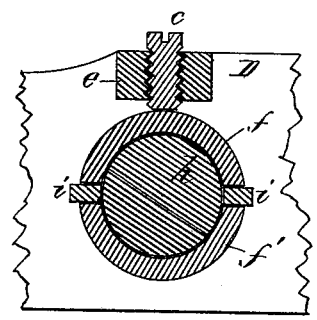
Fig. II
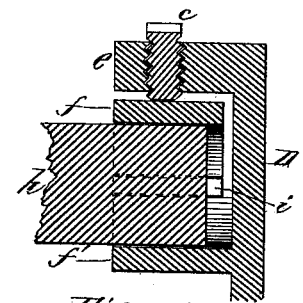
Fig. III
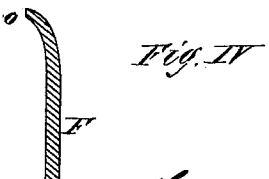
Fig. IV
Witnesses.
F. E. Curtis.
C. M. Woods
Inventor.
Henry G. Fiske.
By T. A. Curtis, his Atty.

UNITED STATES PATENT OFFICE.

HENRY G. FISKE, OF SPRINGFIELD, MASSACHUSETTS.

IMPROVEMENT IN LAWN-MOWERS.

Specification forming part of Letters Patent No. 220,226, dated October 7, 1879; application filed July 2, 1879.

*To all whom it may concern:*

Be it known that I, HENRY G. FISKE, of Springfield, in the State of Massachusetts, have invented a new and useful Improvement in Lawn-Mowing Machines; and that the following is a full, clear, and exact description thereof, reference being had to the accompanying drawings, making a part of this specification, and to the letters of reference marked thereon.

My invention relates to a machine for cutting grass upon lawns; and its object is to prevent the actuating-roller from slipping upon the grass or turf, and to make the actuating-roller, which extends the whole width of the machine, much lighter than in the ordinary roller-machines of that class; to provide a cheap and effective journal-box for the revolving cutter-shaft; and to provide convenient means of tilting the machine in drawing the machine from one place to another without using the cutters or knives.

To this end my invention consists, first, of an actuating-roller having apertures or openings in its periphery, through or into which the grass or turf may protrude when being used, in combination with a revolving cutter-shaft having blades or cutters secured thereto and operated by said roller; and it consists, second, of a journal-box having its lower portion made in one piece with the frame, its upper portion being made separate and held down against the cutter-shaft and against a packing by a screw turned through a lug cast upon the frame against the upper loose portion; and it consists, third, of a stop or projection made on the frame, which, combined with the latter, permits the machine to be conveniently rolled from one place to another without using the knives or cutters, all which will be more fully hereinafter described.

Figure I is a perspective view of a lawn-mowing machine having my invention applied thereto. Fig. II is a transverse section of the journal-box. Fig. III is a longitudinal section of the same; and Fig. IV is a transverse section of one knife or cutter.

As represented in the drawings, the roll C, which actuates the mechanism, consists of two disks, B, one at each end, with a series of rods, *a*, firmly secured, at suitable intervals, in the outer edge of these disks, and extending from one to the other. These rods may be made of steel or other suitable wire, so as to be sufficiently rigid, and may be cast into the disks B, and when made in this way the roll C has a general cylindrical shape.

The cutters F are attached either to arms or to disks G in the usual manner, which are secured to a shaft, *h*, revolving in a journal-box made upon the inside of the casting or frame D. This box consists of a semi-cylindrical-shaped projecting socket, *f'*, cast on the inside of the frame D, with a projecting lug, *e*, cast above it.

The end of the shaft *h* is inserted in the socket *f'*, and the loose cap *f* is placed over the end of the shaft, and a screw, *c*, is turned down through a threaded hole made in the lug *e* and against the cap *f*, with a leather or other flexible packing, *i*, placed between the edges of the cap and the edges of the socket on both sides. By this means just the desired degree of pressure is brought to bear upon the cap and upon the shaft *h* beneath to prevent the shaft from becoming too loose in its bearing, and the screw *c* is prevented from getting loose by the flexible packing *i*, the latter being somewhat elastic.

By making the actuating-roller C with wires, or with apertures in its periphery, the roller has a better hold upon the turf, and is prevented from slipping thereon, as the wires are pressed down into the turf, and the same result would obtain if the roller were cast in the form of a hollow cylinder, all in one piece, with apertures or openings in its periphery, as then portions of the grass and turf would be pressed up through the openings as the roller passed over the ground, and the roller would thereby obtain a firmer hold on the ground and be prevented from slipping, and the cutters F would thereby be made to act more promptly and positively in cutting the grass, as the cutters are actuated by the roller through the ordinary system of geared wheels connecting the roller with the cutter-shaft. I am thus enabled to have the actuating-roller extend the whole width of the machine, which causes the latter to be operated much more easily, as it is not so readily impeded by holes and other inequalities in the ground, as is the case when two side actuating-wheels are employed, and it is very much lighter and much more easily managed than the ordinary roller-machine, and the grass and turf are not crushed, as is the case with a solid roller.

I am aware that different forms of rollers have heretofore been used in other agricultural implements and machines; and I do not claim a roller of any particular form or construction, *per se*, or irrespective of my arrangement of the same, combined with the revolving cutters or blades, as hereinbefore described, and adapted to a lawn-mowing machine.

The handle-irons E may be attached to a handle of any desired form and material, and they are secured to the frame by a pivot, $t$, extending through a slot, 4, in the irons; and a stop, 2, is made on the frame D, just below the pivot $t$, one on each side of the frame, so that by tilting the handle forward into the position shown in Fig. I until the sides 3 of the irons are parallel with and against the upper side of the stop 2 on each side of the frame, and then forcing the handle directly backward on its pivots $t$ the length of the slot 4, the handle will then be held in that position on the frame, and the machine may then be tilted up and the cutters raised from the ground, and the machine be rolled on its roller C without using the cutters, which is a convenient way of taking the machine from one part of the grounds to another without using the cutters.

For convenience of stopping the handle-irons E at the right point when tilted forward, as above described, I make an additional stop, 1, in front of the stop 2; but this is not essential.

Having thus described my invention, what I claim as new is—

1. In a lawn-mowing machine, the actuating-roller C, made with apertures or openings in its periphery, in combination with a revolving cutter-shaft having a series of knives or cutters secured thereto, substantially as described.

2. A journal-box for a lawn-mowing machine, consisting of the socket $f'$ and lug $e$, both made rigid with the frame of the machine, combined with the removable cap $f$, screw $c$, and packing $i$, substantially as described.

3. In a lawn-mowing machine, the stops 2 and pivots $t$, both made rigid with or upon the frame of the machine, combined with the slotted handle-irons E, substantially as and for the purpose set forth.

HENRY G. FISKE.

Witnesses:
T. A. CURTIS,
F. E. CURTIS.